United States Patent
Suzuki et al.

(10) Patent No.: US 9,453,762 B2
(45) Date of Patent: Sep. 27, 2016

(54) COMMUNICATION LIGHT DETECTOR

(71) Applicant: Hitachi Metals, Ltd., Tokyo (JP)

(72) Inventors: Kanako Suzuki, Hitachi (JP); Tetsuro Sato, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 210 days.

(21) Appl. No.: 14/482,719

(22) Filed: Sep. 10, 2014

(65) Prior Publication Data
US 2015/0253182 A1 Sep. 10, 2015

(30) Foreign Application Priority Data
Mar. 4, 2014 (JP) .................................. 2014-041651

(51) Int. Cl.
*G01J 1/02* (2006.01)
*H04B 10/079* (2013.01)

(52) U.S. Cl.
CPC .......... *G01J 1/0271* (2013.01); *H04B 10/0795* (2013.01)

(58) Field of Classification Search
CPC ............................ G01J 1/0271; H04B 10/0795
USPC ....................... 250/239; 385/31; 398/20, 141
See application file for complete search history.

(56) References Cited

U.S. PATENT DOCUMENTS

| 7,238,935 B2* | 7/2007 | Asada ........................ G01J 1/58 250/216 |
|---|---|---|
| 8,213,791 B2 | 7/2012 | Kojima et al. |
| 2010/0008676 A1 | 1/2010 | Kojima et al. |
| 2010/0329604 A1 | 12/2010 | Kojima et al. |

FOREIGN PATENT DOCUMENTS

| JP | 2009145676 | 7/2009 |
| JP | 2011013360 | 1/2011 |

* cited by examiner

*Primary Examiner* — Seung C Sohn
(74) *Attorney, Agent, or Firm* — Roberts Mlotkowski Safran Cole & Calderon, PC

(57) ABSTRACT

A communication light detector is removably attached to a communication light visualizing adaptor with a light extraction hole so as to detect whether a communication light is transmitted through the communication light visualizing adaptor. The detector includes a detector main body including a bottom surface that faces the light extraction hole, mounts a light-receiving element and is formed so as to adapt to a first communication light visualizing adaptor, and an attachment that includes a front surface facing the bottom surface, a back surface facing the light extraction hole and a though-hole penetrating from the front surface to the back surface so that the light-receiving element is exposed from the front surface to the back surface, the front surface being formed so as to adapt to the bottom surface and the back surface being formed so as to adapt to a second communication light visualizing adaptor.

4 Claims, 5 Drawing Sheets

COM: COMMUNICATED
NCOM: NOT COMMUNICATED

COM: COMMUNICATED
NCOM: NOT COMMUNICATED

COM: COMMUNICATED
NCOM: NOT COMMUNICATED

COMMUNICATION LIGHT DETECTOR

The present application is based on Japanese patent application No. 2014-041651 filed on Mar. 4, 2014, the entire contents of which are incorporated herein by reference.

BACKGROUND OF THE INVENTION

1. Field of the Invention

The invention relates to a communication light detector to visually checking the used/unused state of an optical transmission line by visualizing a communications light.

2. Description of the Related Art

In optical communication-related equipment, a used/unused state (hereinafter, referred to as "communication state") is visually confirmed by visualizing communication light in an invisible light range to monitor steadiness of optical transmission line or to prevent man-caused erroneous removal of connector.

For visually confirming the communication state of the optical transmission line, a communication light detector to be removably attached to an adaptor having a light extraction hole (hereinafter, referred to as "communication light visualizing adaptor") is used to detect whether or not the communication light is transmitted through the communication light visualizing adaptor based on the presence of leak light, which is an extracted portion of communication light transmitting through the communication light visualizing adaptor and is received through the light extraction hole, and then to output the communication state of the optical transmission line in the form allowing human to visually confirm it (see e.g. JP-A-2009-145676, JP-A-2010-231082, JP-A-2011-013359 and JP-A-2011-013360).

SUMMARY OF THE INVENTION

In the optical communication-related equipment, various types of connectors such as SC connector and LC connector are used. Correspondingly, various types of adaptors such as SC adaptor and LC adaptor are used as a communication light visualizing adaptor to connect the connectors.

However, the conventional communication light detectors are formed in a shape corresponding to only specific types of communication light visualizing adaptors, such as corresponding to only communication light visualizing adaptors with SC adaptor or only communication light visualizing adaptors with LC adaptor. Therefore, it is necessary to provide the same number of communication light detectors as the types of adaptors and this causes an increase in cost in case of visualizing the communication light.

It is an object of the invention to provide a communication light detector that is adapted to be attached to various types of communication light visualizing adaptors.

(1) According to one embodiment of the invention, a communication light detector for being removably attached to a communication light visualizing adaptor with a light extraction hole so as to detect whether a communication light is transmitted through the communication light visualizing adaptor by receiving through the light extraction hole a leak light as a part of the communication light transmitted through the communication light visualizing adaptor comprises:

a detector main body comprising a bottom surface that faces the light extraction hole, mounts a light-receiving element and is formed so as to adapt to a first communication light visualizing adaptor; and an attachment that comprises a front surface facing the bottom surface, a back surface facing the light extraction hole and a though-hole formed penetrating from the front surface to the back surface so that the light-receiving element is exposed from the front surface to the back surface, the front surface being formed so as to adapt to the bottom surface and the back surface being formed so as to adapt to a second communication light visualizing adaptor.

In the above embodiment (1) of the invention, the following modifications and changes can be made.

(i) The detector main body comprises a first magnet arranged on the bottom surface, wherein the attachment comprises a second magnet arranged on the front surface, and wherein the detector main body is removably coupled to the attachment by the first and second magnets.

(ii) The detector main body comprises a positioning bar formed on the bottom surface, and wherein the attachment comprises a housing hole to house the positioning bar so that the positioning bar is not exposed from the front surface to the back surface.

(iii) The positioning bar is formed at a position offset from a center of the detector main body.

Effects of the Invention

According to one embodiment of the invention, a communication light detector can be provided that is adapted to be attached to various types of communication light visualizing adaptors.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

A preferred embodiment of the invention will be described below in conjunction with the appended drawings.

Figure 1:
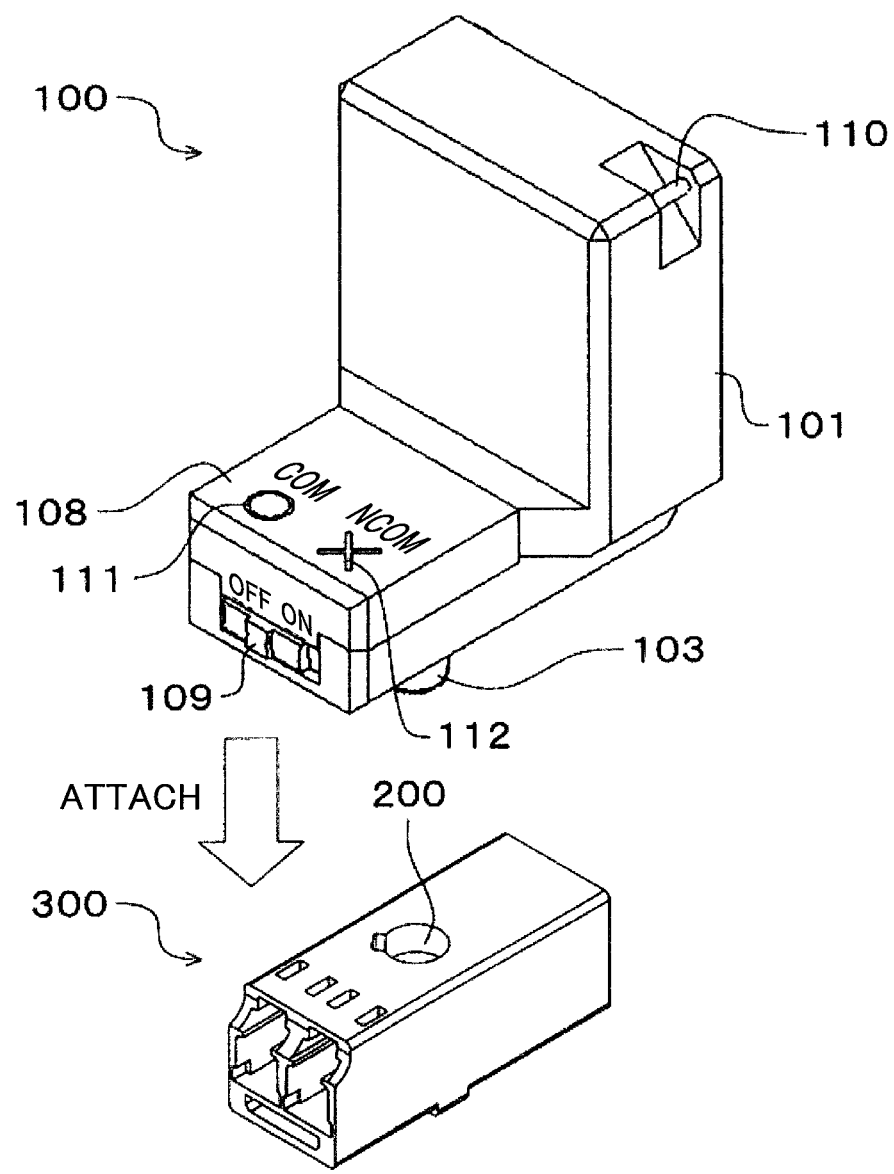
FIG. 1 is a perspective view showing a communication light detector of the present invention in case that the communication light detector is attached to a LC connector.
Figure 2:
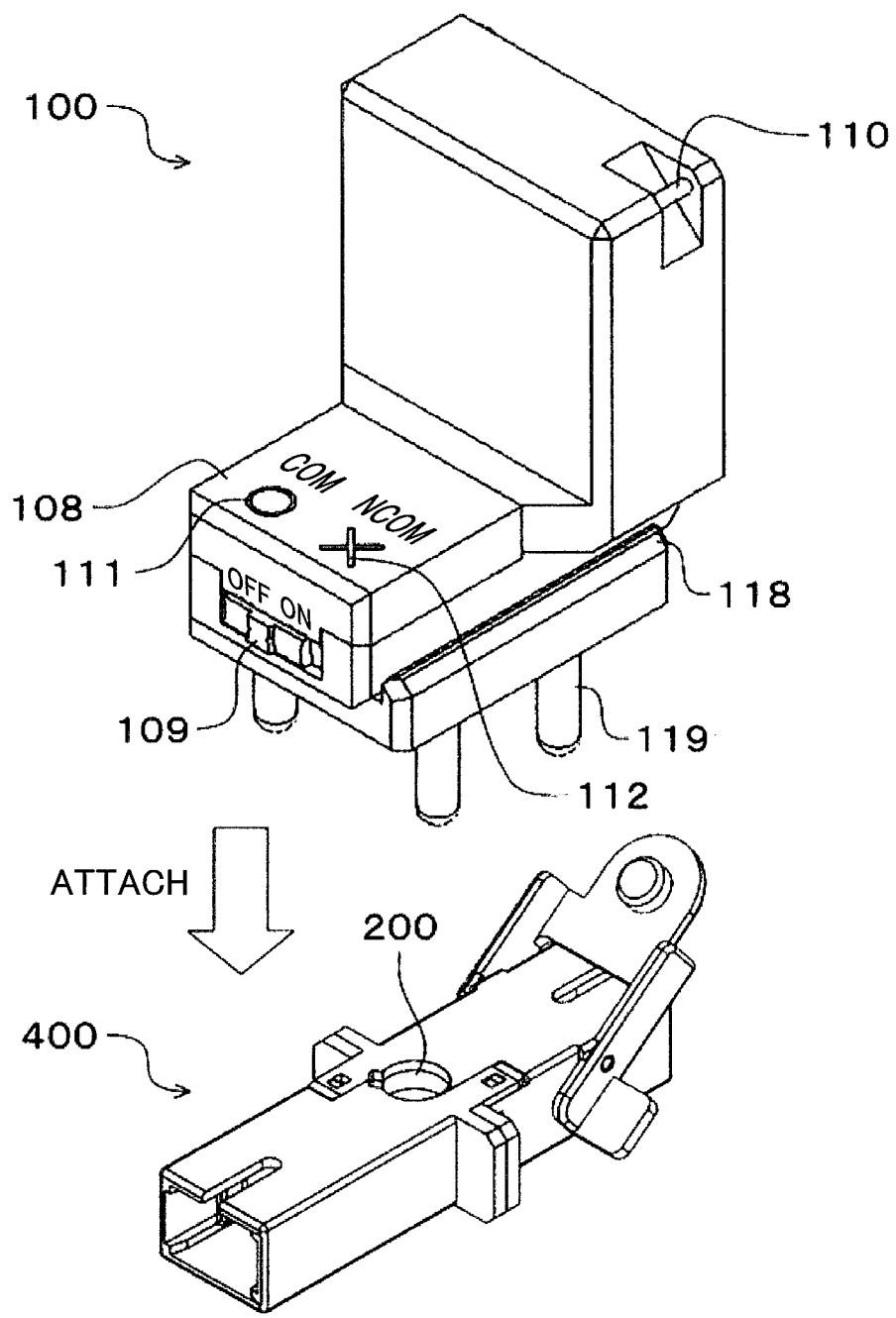
FIG. 2 is a perspective view showing the communication light detector of the invention in case that the communication light detector is attached to a SC connector.

As shown in FIGS. 1 and 2, a communication light detector 100 in the preferred embodiment of the invention is removably attached to a first communication light visualizing adaptor 300 or a second communication light visualizing adaptor 400 each having a light extraction hole 200 to detect whether or not communication light is transmitted through the first communication light visualizing adaptor 300 or the second communication light visualizing adaptor 400 based on the presence of leak light which is an extracted portion of communication light transmitting through the first communication light visualizing adaptor 300 or the second communication light visualizing adaptor 400 and is received through the light extraction hole 200.

Although the embodiment using a LC adaptor as the first communication light visualizing adaptor 300 and a SC adaptor as the second communication light visualizing adaptor 400 will be described here as an example, the first communication light visualizing adaptor 300 and/or the second communication light visualizing adaptor 400 may be another type of adaptor.

It should be noted that the first communication light visualizing adaptor 300 and the second communication light visualizing adaptor 400 will not be described in detail in the present specification since it departs from the gist of the invention.

Here, the leak light means light which is a portion of communication light transmitting through an optical transmission line and is extracted to the outside of the optical transmission line through a light extraction portion formed in the midway of the optical transmission line.

As the light extraction portion, a conventionally-known off-axis portion, etc., can be employed but will not be described in detail in the present specification since it departs from the gist of the invention.

Figure 3:
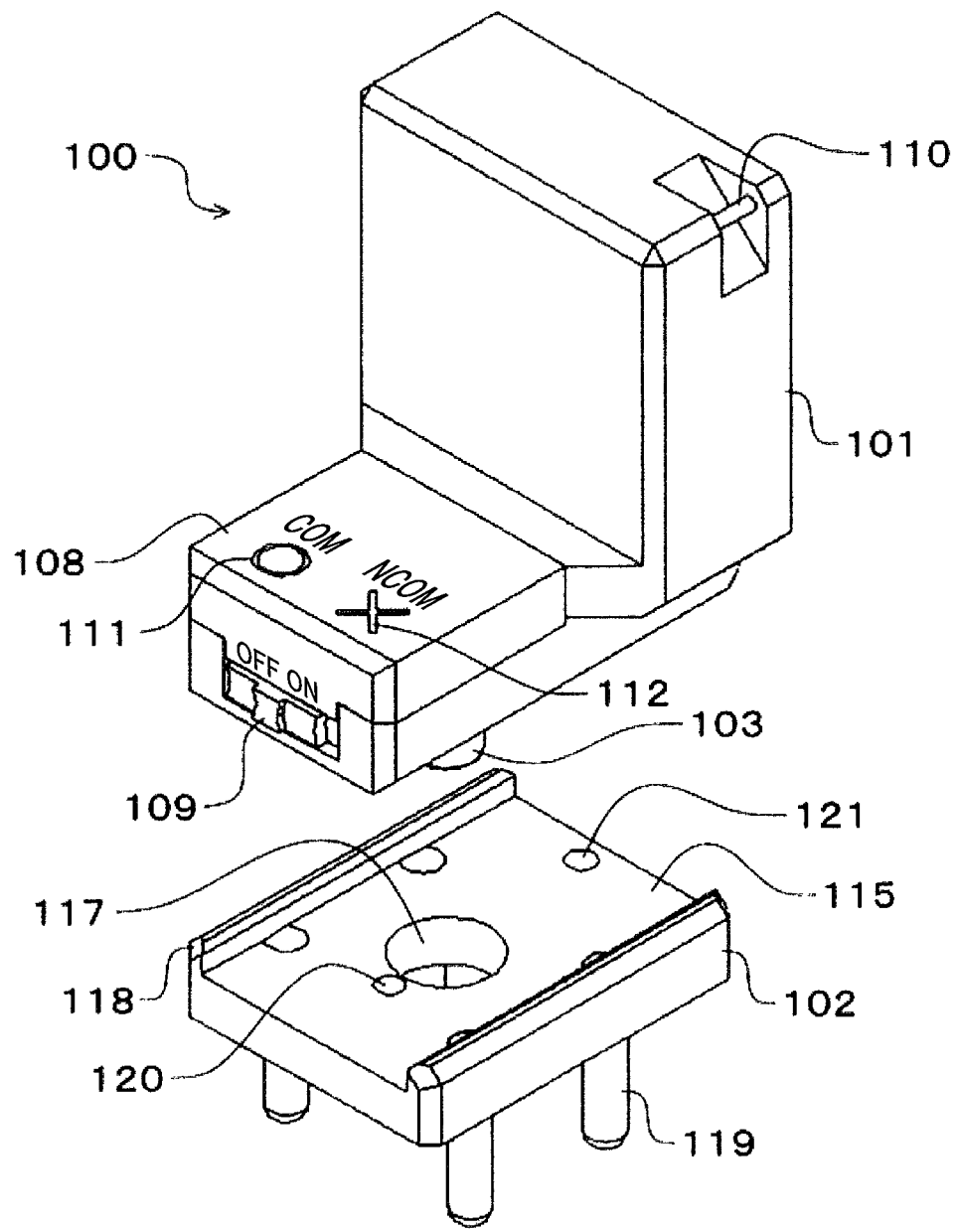
FIG. 3 is a perspective view showing the communication light detector of the invention as viewed from obliquely above.
Figure 4:
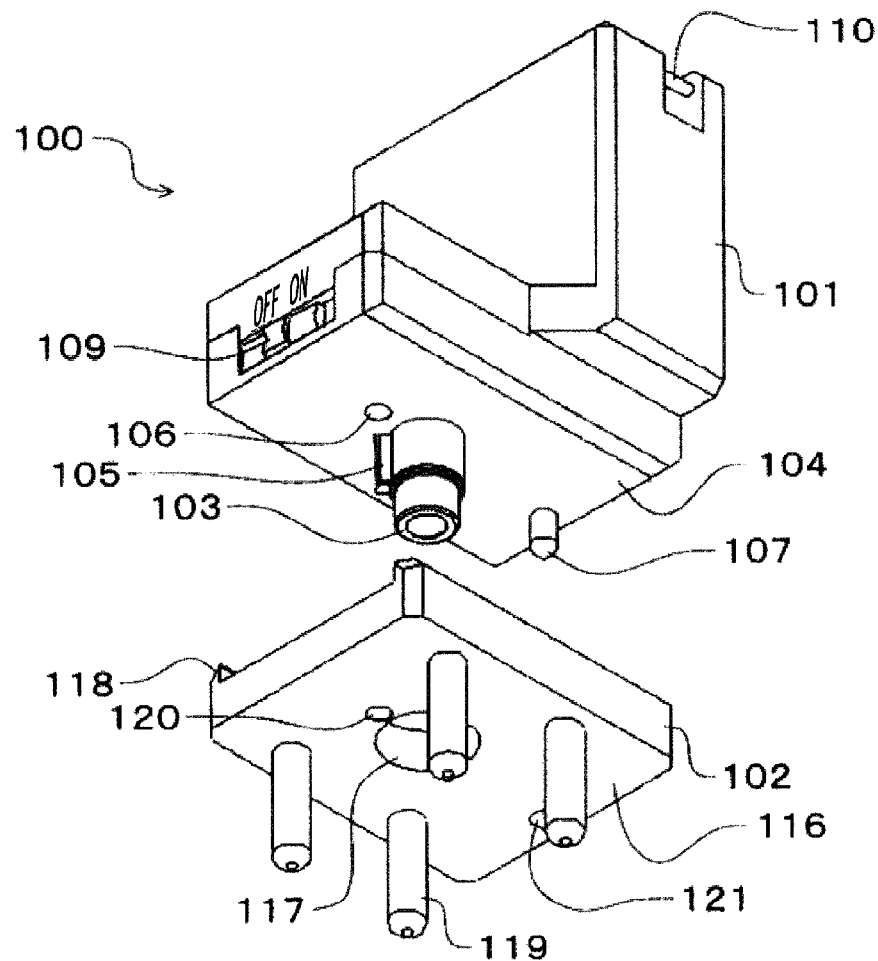
FIG. 4 is a perspective view showing the communication light detector of the invention as viewed from obliquely downward.

As shown in FIGS. 3 and 4, the communication light detector 100 is provided with a detector main body 101 and an attachment 102.

The detector main body 101 has a bottom surface 104 facing the light extraction hole 200 and mounting a light-receiving element 103. The bottom surface 104 is formed in a shape corresponding to the first communication light visualizing adaptor 300.

The light-receiving element 103 has an end portion vertically protruding from the bottom surface 104 and is configured that the end portion is housed in the light extraction hole 200 when the communication light detector 100 is removably attached to the first communication light visualizing adaptor 300 or the second communication light visualizing adaptor 400.

This results in that the light-receiving element 103 is shielded from light except the leak light when the communication light detector 100 is removably attached to the first communication light visualizing adaptor 300 or the second communication light visualizing adaptor 400. Therefore, it is possible to reliably receive only the leak light by the light-receiving element 103, thereby allowing the communication state of the optical transmission line to be confirmed more accurately.

On the bottom surface 104 mounting the light-receiving element 103, a hollow-cylindrical mounting portion 105 is formed to house the light-receiving element 103. The mounting portion 105 has an outer shape not in a perfect circle and is formed in an irregular shape which corresponds to the shape of the light extraction hole 200.

Thus, when the communication light detector 100 is removably attached to the first communication light visualizing adaptor 300 or the second communication light visualizing adaptor 400, the communication light detector 100 does not rotate with respect to the first communication light visualizing adaptor 300 or the second communication light visualizing adaptor 400 and positional offset of the light-receiving element 103 is thus less likely to occur, which allows the communication state of the optical transmission line to be confirmed more stably.

Since the bottom surface 104 of the detector main body 101 is formed in a shape corresponding to the first communication light visualizing adaptor 300, it is possible to removably attach the detector main body 101 to the first communication light visualizing adaptor 300. Therefore, whether or not the communication light is transmitted through the first communication light visualizing adaptor 300 can be detected based on the presence of the leak light which is an extracted portion of communication light transmitting through the first communication light visualizing adaptor 300 and is received through the light extraction hole 200.

In addition, the detector main body 101 has a first magnet 106 arranged on the bottom surface 104, a positioning bar 107 formed on the bottom surface 104 and inserted into a positioning hole formed on a module mounting the first communication light visualizing adaptor 300, a display 108 outputting the communication state of the optical transmission line in the form allowing human to visually confirm it, a switch 109 for turning on/off the power, and an attachment portion 110 for attaching a strap.

It should be noted that, the positioning hole is formed on only the module mounting the first communication light visualizing adaptor 300 and is not formed on a module mounting the second communication light visualizing adaptor 400. Therefore, the communication light detector 100 cannot be attached to the second communication light visualizing adaptor 400 since the positioning bar 107 interrupts.

Figure 5:
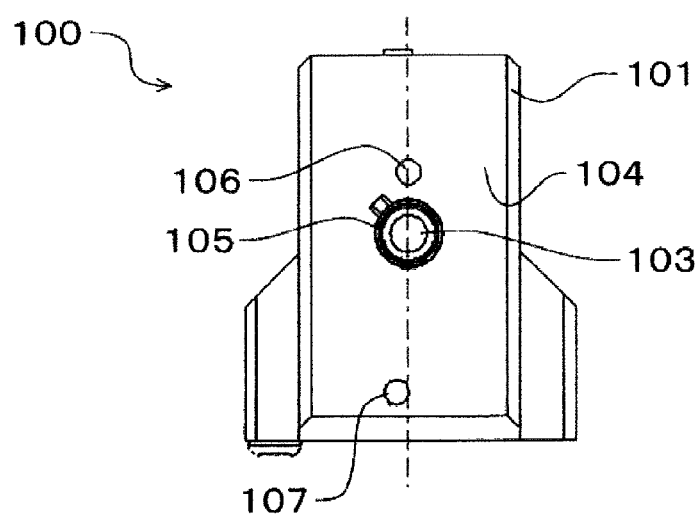
FIG. 5 is a bottom view showing the communication light detector of the invention in case that the communication light detector is attached to a LC connector.

As shown in FIG. 5, the positioning bar 107 is formed at a position offset from the center of the detector main body 101. Therefore, when a worker is trying to attach the communication light detector 100 to the module mounting the second communication light visualizing adaptor 400 which does not have a positioning hole, the communication light detector 100 topples over and this allows the worker to know that the module is wrong.

The display 108 has a first indicator light 111 and a second indicator light 112. The first indicator light 111 is switched on in the used state of the optical transmission line and off in the unused state of the optical transmission line. The second indicator light 112 is switched off in the used state of the optical transmission line and on in the unused state of the optical transmission line.

Alternatively, the display 108 may be, e.g., one indicator light which is switched on in the used state of the optical transmission line and off in the unused state of the optical transmission line, or a liquid crystal display which displays the communication state of the optical transmission line.

The switch 109 serves to switch on/off of power supply to the display 108, etc., from a battery, etc., which is mounted on the communication light detector 100.

The attachment portion 110 serves to provide portability of the communication light detector 100 for workers.

Figure 6:
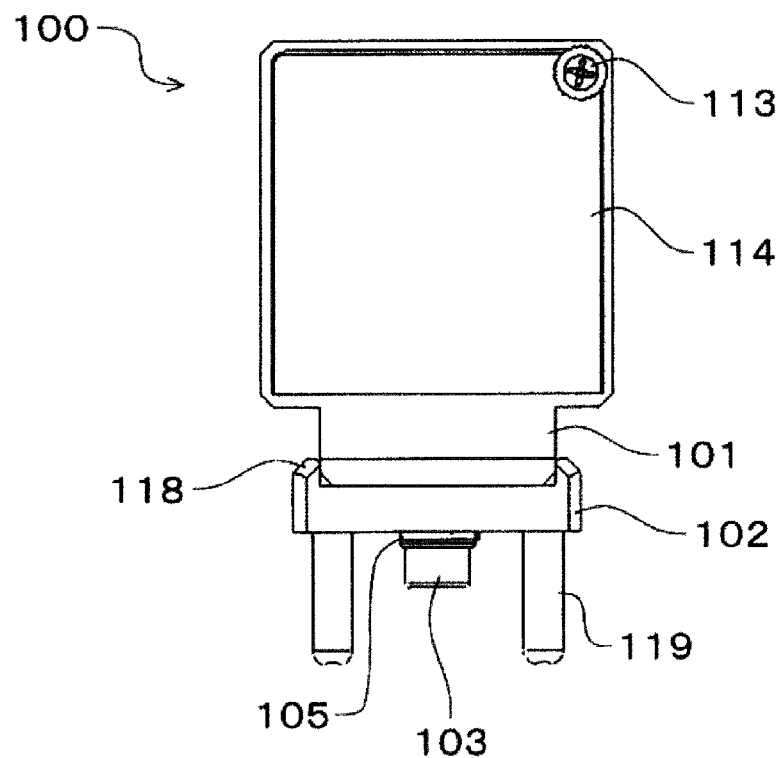
FIG. 6 is a rear view showing the communication light detector of the invention in case that the communication light detector is attached to a SC connector.

In addition, as shown in FIG. 6, a lid 114 which can be opened/closed by a tightening member 113 such as a screw is attached to the detector main body 101 for easy replacement of battery.

The attachment 102 has a front surface 115 facing the bottom surface 104, a back surface 116 facing the light extraction hole 200 and a though-hole 117 formed to penetrate from the front surface 115 to the back surface 116 so that the light-receiving element 103 can be exposed from the front surface 115 to the back surface 116. The front surface 115 is formed in a shape corresponding to the bottom surface 104 and the back surface 116 is formed in a shape corresponding to the second communication light visualizing adaptor 400.

A guiding portion 118 is formed on the front surface 115 to guide the detector main body 101 to a predetermined position on the attachment 102. Therefore, it is possible to precisely position the detector main body 101 with respect to the attachment 102 and to prevent looseness when the detector main body 101 is attached to the attachment 102.

Two pairs of positioning legs 119 are formed on the back surface 116 to sandwich and hold the second communication light visualizing adaptor 400 and to position the light-receiving element 103 with respect to the light extraction hole 200 when the detector main body 101 is attached to the second communication light visualizing adaptor 400.

Thus, the communication light detector 100 can be positioned with respect to the first communication light visualizing adaptor 300 and with respect to the second communication light visualizing adaptor 400 respectively by different means, i.e., the positioning bar 107 and the positioning legs 119.

Figure 7:
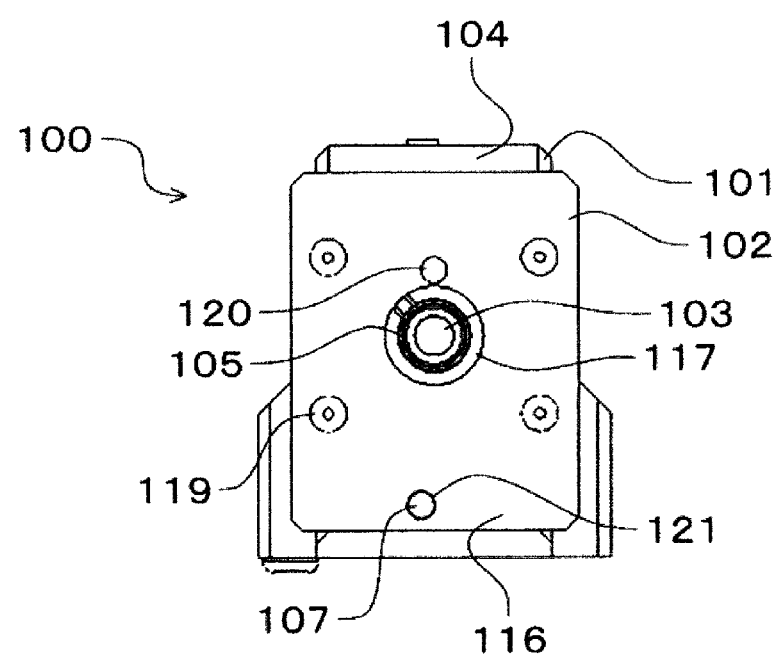
FIG. 7 is a bottom view showing the communication light detector of the invention in case that the communication light detector is attached to a SC connector.

As shown in FIG. 7, the though-hole 117 is formed in a size large enough to allows the light-receiving element 103 and the mounting portion 105 to pass therethrough.

Since the back surface 116 of the attachment 102 is formed in a shape corresponding to the second communication light visualizing adaptor 400, it is possible to removably attach the detector main body 101 to the second communication light visualizing adaptor 400 via the attachment 102 and thus to detect whether or not the communication light is transmitted through the second communication light visualizing adaptor 400 based on the presence of the leak light which is an extracted portion of communication light transmitting through the second communication light visualizing adaptor 400 and is received through the light extraction hole 200.

In addition, the attachment 102 has a second magnet 120 arranged on the front surface 115 and a housing hole 121 for housing the positioning bar 107 so that the positioning bar 107 is not exposed from the front surface 115 to the back surface 116.

The second magnet 120 is paired with the first magnet 106 and the detector main body 101 is removably coupled to the attachment 102 via the first magnet 106 and the second magnet 120. This allows the detector main body 101 to be easily coupled/released to/from the attachment 102.

The housing hole 121 is formed deep enough to house the positioning bar 107 throughout the length thereof. In other words, the attachment 102 needs to have a thickness greater than the entire length of the positioning bar 107.

As described above, the communication light detector 100 in the preferred embodiment of the invention uses the attachment 102 and it is thus possible to provide the communication light detector 100 attachable to various types of communication light visualizing adaptors.

In addition, use of plural attachments 102 having shapes corresponding to various types of communication light visualizing adaptors allows the communication light detector 100 to be attached two or more types of communication light visualizing adaptors.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A communication light detector for being removably attached to a communication light visualizing adaptor with a light extraction hole so as to detect whether a communication light is transmitted through the communication light visualizing adaptor by receiving through the light extraction hole a leak light as a part of the communication light transmitted through the communication light visualizing adaptor, the detector comprising:
a detector main body comprising a bottom surface that faces the light extraction hole, mounts a light-receiving element and is formed so as to adapt to a first communication light visualizing adaptor; and
an attachment that comprises a front surface facing the bottom surface, a back surface facing the light extraction hole and a though-hole formed penetrating from the front surface to the back surface so that the light-receiving element is exposed from the front surface to the back surface, the front surface being formed so as to adapt to the bottom surface and the back surface being formed so as to adapt to a second communication light visualizing adaptor.

2. The communication light detector according to claim 1, wherein the detector main body comprises a first magnet arranged on the bottom surface,
wherein the attachment comprises a second magnet arranged on the front surface, and
wherein the detector main body is removably coupled to the attachment by the first and second magnets.

3. The communication light detector according to claim 1, wherein the detector main body comprises a positioning bar formed on the bottom surface, and
wherein the attachment comprises a housing hole to house the positioning bar so that the positioning bar is not exposed from the front surface to the back surface.

4. The communication light detector according to claim 3, wherein the positioning bar is formed at a position offset from a center of the detector main body.

* * * * *